(12) United States Patent
Shibai

(10) Patent No.: US 11,472,231 B2
(45) Date of Patent: Oct. 18, 2022

(54) PNEUMATIC TIRE

(71) Applicant: The Yokohama Rubber Co., LTD., Tokyo (JP)

(72) Inventor: Takashi Shibai, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 300 days.

(21) Appl. No.: 16/079,986

(22) PCT Filed: Feb. 1, 2017

(86) PCT No.: PCT/JP2017/003584
§ 371 (c)(1),
(2) Date: Aug. 24, 2018

(87) PCT Pub. No.: WO2017/145681
PCT Pub. Date: Aug. 31, 2017

(65) Prior Publication Data
US 2019/0061431 A1   Feb. 28, 2019

(30) Foreign Application Priority Data

Feb. 26, 2016  (JP) .............................. JP2016-035503

(51) Int. Cl.
| | | |
|---|---|---|
| *B60C 11/13* | (2006.01) | |
| *B60C 11/03* | (2006.01) | |
| *B60C 11/12* | (2006.01) | |

(52) U.S. Cl.
CPC .......... *B60C 11/0304* (2013.01); *B60C 11/03* (2013.01); *B60C 11/1236* (2013.01);
(Continued)

(58) Field of Classification Search
CPC .............................................. B60C 2011/0381
See application file for complete search history.

(56) References Cited

U.S. PATENT DOCUMENTS

| 4,945,966 A | 8/1990 | Ogawa |
| 2008/0092999 A1* | 4/2008 | Miyazaki .............. B60C 11/032 |
| | | 152/209.15 |

(Continued)

FOREIGN PATENT DOCUMENTS

| JP | S63-106110 | 5/1988 |
| JP | H09-300918 | 11/1997 |

(Continued)

OTHER PUBLICATIONS

International Search Report for International Application No. PCT/JP2017/003584 dated May 9, 2017, 4 pages, Japan.

*Primary Examiner* — Timothy Kennedy
*Assistant Examiner* — Farah Taufiq
(74) *Attorney, Agent, or Firm* — Thorpe North & Western

(57) ABSTRACT

A pneumatic tire includes a tread; sidewalls; and beads. The tread includes main grooves, including a center main groove extending in a tire circumferential direction and a pair of shoulder main grooves extending in the tire circumferential direction, and land portions defined between the main grooves. At least one of the land portions includes lug grooves extending from at least one of the main grooves defining the at least one of the land portions and terminating within the at least one of the land portions. At least one of the lug grooves includes a raised bottom portion that is shallower than a groove bottom at a portion on an opening end side and a communicating portion that extends in a longitudinal direction of the at least one of the lug grooves following the raised bottom portion and is deeper than the raised bottom portion.

18 Claims, 9 Drawing Sheets

(52) U.S. Cl.
CPC ....... B60C 11/13 (2013.01); *B60C 2011/0346* (2013.01); *B60C 2011/0348* (2013.01); *B60C 2011/0369* (2013.01); *B60C 2011/0383* (2013.01); *B60C 2011/1361* (2013.01); *B60C 2200/04* (2013.01)

(56) References Cited

U.S. PATENT DOCUMENTS

| | | | |
|---|---|---|---|
| 2009/0320981 A1* | 12/2009 | Matsumoto | B60C 11/13 152/209.8 |
| 2012/0273104 A1 | 11/2012 | Ishida | |
| 2013/0068360 A1* | 3/2013 | Tamugi | B60C 11/12 152/209.18 |
| 2013/0167997 A1* | 7/2013 | Hayashi | B60C 11/0306 152/209.18 |
| 2014/0305559 A1* | 10/2014 | Takemoto | B60C 11/0304 152/209.8 |
| 2017/0001479 A1 | 1/2017 | Rubber | |
| 2017/0008346 A1* | 1/2017 | Kubo | B60C 11/0302 |

FOREIGN PATENT DOCUMENTS

| | | | |
|---|---|---|---|
| JP | 2002-240512 | | 8/2002 |
| JP | 2005-231430 | | 9/2005 |
| JP | 2008-222075 | | 9/2008 |
| JP | 2010-195204 | | 9/2010 |
| JP | 2012-131265 | | 7/2012 |
| JP | 2012-228992 | | 11/2012 |
| JP | 2013-216118 | | 10/2013 |
| JP | 2013216118 A | * | 10/2013 |
| JP | 2015-016839 | | 1/2015 |
| JP | 2015071373 A | * | 4/2015 |
| JP | 2015-140100 | | 8/2015 |
| WO | WO 2015/111302 | | 7/2015 |
| WO | WO 2015/115015 | | 8/2015 |

* cited by examiner

PNEUMATIC TIRE

TECHNICAL FIELD

The present technology relates to a pneumatic tire including land portions defined by a main groove in a tread portion, and particularly relates to a pneumatic tire that can provide good steering stability on dry road surfaces and steering stability on wet road surfaces, which have a negative correlation, in a compatible manner and suppress a decrease in wet performance when the pneumatic tire is worn.

BACKGROUND ART

Pneumatic tires use a tread pattern in which a plurality of main grooves extending in a tire circumferential direction and rows of land portions defined by the main grooves are formed in a tread portion (for example, see Japan Unexamined Patent Publication No. 2012-228992). In such pneumatic tires, a plurality of lug grooves extending in a tire lateral direction are formed in the land portions in the tread portion to ensure excellent drainage performance through the lug grooves.

However, when the number of lug grooves in the tread portion increases, the rigidity of the tread portion decreases, and thus steering stability on dry road surfaces declines. On the other hand, when the number of lug grooves in the tread portion decreases, the drainage performance decreases, and thus steering stability on wet road surfaces declines. In this manner, the steering stability on dry road surfaces and the steering stability on wet road surfaces are in a negative correlation, and, consequently, it is difficult to improve both the steering stability on dry road surfaces and the steering stability on wet road surfaces at the same time.

Technology has been proposed that suppresses land portion collapse and enhances uneven wear resistance and steering stability by providing a raised bottom portion at a portion of a lug groove near an opening end to a main groove (see, for example, Japan Unexamined Patent Publication Nos. 2012-131265 and 2015-140100). However, by providing the raised bottom portion at the portion of the lug groove near the opening end to the main groove, when wear advances, the drainage passage between the lug groove and the main groove is reduced. Thus, wet performance when the pneumatic tire is worn is greatly reduced.

SUMMARY

The present technology provides a pneumatic tire that can provide good steering stability on dry road surfaces and steering stability on wet road surfaces, which have a negative correlation, in a compatible manner and suppress a decrease in wet performance when the pneumatic tire is worn.

A pneumatic tire according to an embodiment of the present technology includes:

an annular tread portion extending in a tire circumferential direction;

a pair of sidewall portions disposed on either side of the tread portion; and a pair of bead portions disposed inward of the sidewall portions in a tire radial direction;

the tread portion including a plurality of main grooves including a center main groove extending in the tire circumferential direction and a pair of shoulder main grooves extending in the tire circumferential direction, and a plurality of land portions defined between the plurality of main grooves;

at least one land portion of the plurality of land portions including a plurality of lug grooves extending from at least one main groove of the plurality of main grooves and terminating within the at least one land portion; and at least one lug groove of the plurality of lug grooves including a raised bottom portion that is shallower than a groove bottom of the at least one lug groove at a portion of the at least one lug groove on an opening end side and a communicating portion that extends in a longitudinal direction of the at least one lug groove following the raised bottom portion and is deeper than the raised bottom portion.

In an embodiment of the present technology, the lug grooves are provided in at least one land portion and extend from the main groove and terminate within the land portion. By the lug grooves terminating within the land portion, the rigidity of this land portion can be sufficiently ensured, and good steering stability on dry road surfaces and steering stability on wet road surfaces can be provided in a compatible manner. Furthermore, providing the raised bottom portion at a portion of the lug groove on the opening end side suppresses collapse of the land portion and enhances uneven wear resistance and steering stability, and providing the communicating portion extending in the longitudinal direction of the lug groove following the raised bottom portion ensures a drainage passage between the lug groove and the shoulder main groove when wear has advanced, thus suppressing a decrease in wet performance when the pneumatic tire is worn.

In an embodiment of the present technology, preferably, the raised bottom portion is integrally formed with both groove walls of the lug groove, and the communicating portion is disposed at a position separated from both the groove walls of the lug groove. In a configuration in which the raised bottom portion and the communicating portion are disposed as described above, collapse of the land portion can be effectively suppressed and the effect of enhancing uneven wear resistance and steering stability can be increased.

Preferably, a width A of the raised bottom portion and a width W1 of the lug groove satisfy a relationship $0.50 \times W1 \leq A \leq 0.90 \times W1$. By setting the width A of the raised bottom portion in the range described above, an effect of enhancing uneven wear resistance and steering stability can be ensured, and a decrease in wet performance when the pneumatic tire is worn can be suppressed.

Preferably, a depth Dy of the lug groove at the raised bottom portion and a depth Dr of the lug groove satisfy a relationship $0.40 \times Dr \leq Dy \leq 0.85 \times Dr$. By setting the depth Dy of the lug groove at the raised bottom portion in the range described above, uneven wear resistance can be enhanced in a well-balanced manner with steering stability on dry road surfaces and steering stability on wet road surfaces.

Preferably, a depth of the lug groove at the communicating portion is greater than a depth of the lug groove and less than a depth of a main groove of the plurality of main grooves that the lug groove opens to. By setting the depth of the lug groove at the communicating portion in the range described above, a decrease in wet performance when the pneumatic tire is worn can be effectively suppressed.

Preferably, the center main groove has a zigzag shape in the tire circumferential direction;

the lug groove is disposed in a land portion of the plurality of land portions defined between the center main groove having a zigzag shape and a shoulder main groove located outward of the center main groove;

the lug groove extends inward in a tire lateral direction from the shoulder main groove terminating without communicating with the center main groove and includes a bent portion that bends to one side in the tire circumferential direction at a terminating end of the lug groove;

a plurality of narrow grooves are disposed in a land portion of the plurality of land portions including the lug groove, the plurality of narrow grooves extending intermittently in the tire circumferential direction without communicating with the bent portion; and the plurality of narrow grooves are disposed substantially parallel with the center main groove having a zigzag shape. By employing the configuration described above, good steering stability on dry road surfaces and steering stability on wet road surfaces can be provided in a highly compatible manner and uneven wear resistance can be further enhanced.

Preferably, a depth Ds of the plurality of narrow grooves and a depth Dc of the center main groove having a zigzag shape satisfy a relationship $0.10 \times Dc \le Ds \le 0.50 \times Dc$. Setting the depth Ds of the narrow grooves in the above-described range effectively enhances steering stability on dry road surfaces and uneven wear resistance.

Preferably, a gap d1 in a tire axial direction between the plurality of narrow grooves and the center main groove having a zigzag shape and a width d2 in the tire axial direction of the land portion satisfy a relationship $0.10 \times d2 \le d1 \le 0.40 \times d2$. Setting the gap d1 between the narrow grooves and the center main groove having a zigzag shape in the above-described range maximizes the effect of enhancing uneven wear resistance.

Preferably, an inclination angle α of the lug groove including the bent portion with respect to the tire circumferential direction ranges from 25° to 75°. Setting the inclination angle α of the lug grooves with respect to the tire circumferential direction in the above-described range reliably ensures the effect of enhancing steering stability on dry road surfaces.

DETAILED DESCRIPTION

The configuration of the present technology is described in detail below with reference to the accompanying drawings. FIGS. 1 to 9 illustrate a pneumatic tire according to an embodiment of the present technology.

Figure 1:
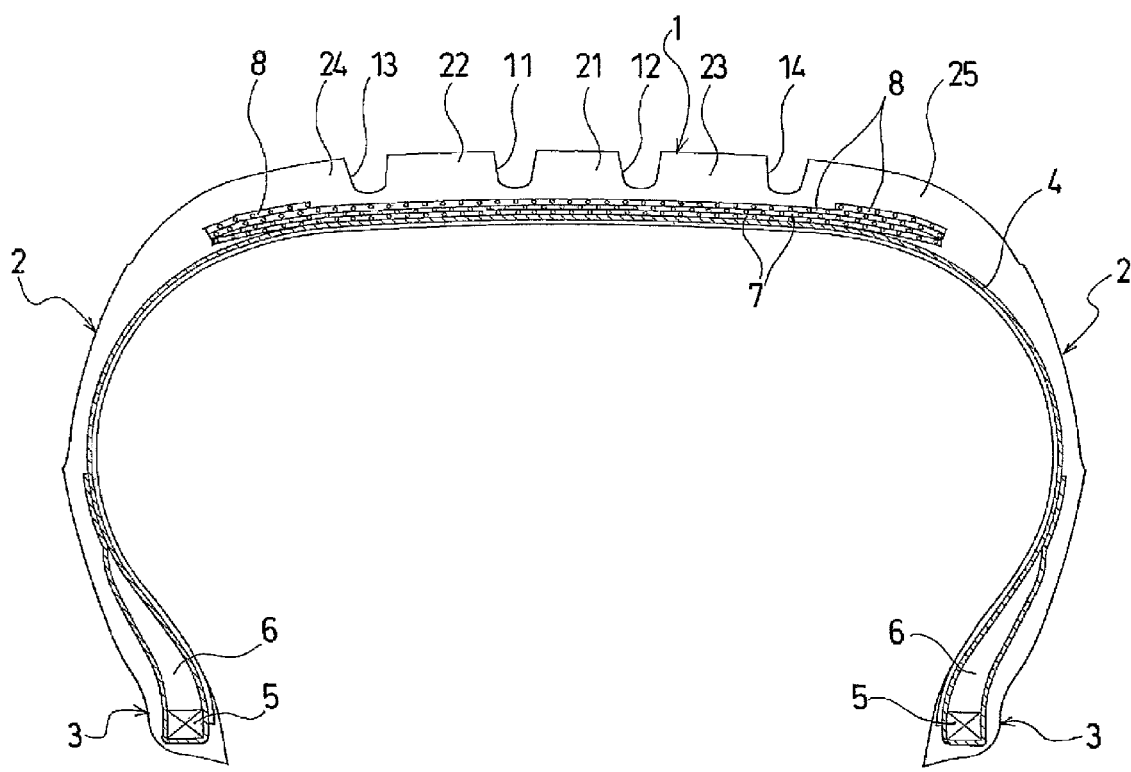
FIG. 1 is a meridian cross-sectional view illustrating a pneumatic tire according to an embodiment of the present technology.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from a rubber composition is disposed on the outer circumference of the bead core 5.

A plurality of belt layers 7 are embedded on the outer circumferential side of the carcass layer 4 in the tread portion 1. These belt layers 7 include a plurality of reinforcing cords that are inclined with respect to the tire circumferential direction and the direction of the reinforcing cords of the different layers intersect each other. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is a representative example of a pneumatic tire and no such limitation is intended.

Figure 2:
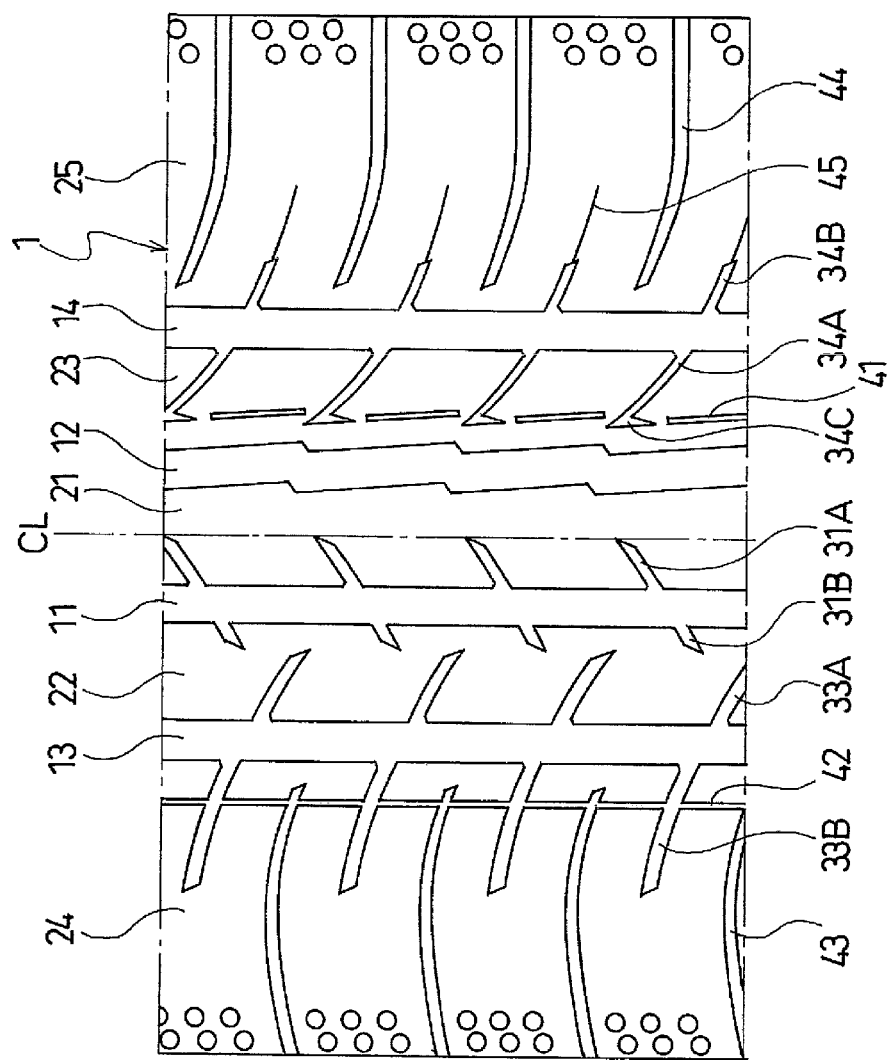
FIG. 2 is a developed view illustrating a tread pattern of the pneumatic tire of FIG. 1.

As illustrated in FIG. 2, four main grooves 11 to 14 extending in the tire circumferential direction are formed in the tread portion 1. In other words, a pair of center main grooves 11 and 12 located on both sides of a tire equator CL and a pair of shoulder main grooves 13 and 14 located on the outer sides of the center main grooves 11 and 12, respectively, in the tire lateral direction are formed in the tread portion 1. Herein, the center main groove 12 has a zigzag shape extending in the tire circumferential direction, and the other main grooves 11, 13, and 14 are linear. These four main grooves 11 to 14 define a center land portion 21 located on the tire equator CL, an intermediate land portion 22 located on one side of the center land portion 21 in the tire lateral direction, an intermediate land portion 23 located on the other side of the center land portion 21 in the tire lateral direction, a shoulder land portion 24 located on the one side of the intermediate land portion 22 in the tire lateral direction, and a shoulder land portion 25 located on the other side of the intermediate land portion 23 in the tire lateral direction in the tread portion 1.

Additionally, a plurality of lug grooves 31A, 31B, 33A, 33B, 34A, and 34B extending from the main grooves 11, 13, and 14, not the center main groove 12 having a zigzag shape, toward both sides in the tire lateral direction and terminating within the corresponding land portions 21 to 25, are formed in the tread portion 1 with an interval between each other in the tire circumferential direction.

More specifically, the lug groove 31A communicates with the center main groove 11 at one end and terminates within the center land portion 21 at the other end, and the lug groove 31B communicates with the center main groove 11 at one end and terminates within the intermediate land portion 22 at the other end. The lug groove 33A communicates with the shoulder main groove 13 at one end and terminates within the intermediate land portion 22 at the other end, and the lug groove 33B communicates with the shoulder main groove 13 at one end and terminates within the shoulder land portion 24 at the other end. The lug groove 34A communicates with the shoulder main groove 14 at one end and terminates within the intermediate land portion 23 at the other end, and the lug groove 34B communicates with the shoulder main groove 14 at one end and terminates within the shoulder land portion 25 at the other end.

Note that the lug grooves 31A and the lug grooves 31B preferably oppose each other. However, the lug grooves 31A and the lug grooves 31B may be offset in the tire circumferential direction to, for example, alleviate pattern noise. This relationship applies to the arrangement of the lug grooves 33A and the lug grooves 33B and the arrangement of the lug grooves 34A and the lug grooves 34B.

Figure 3:
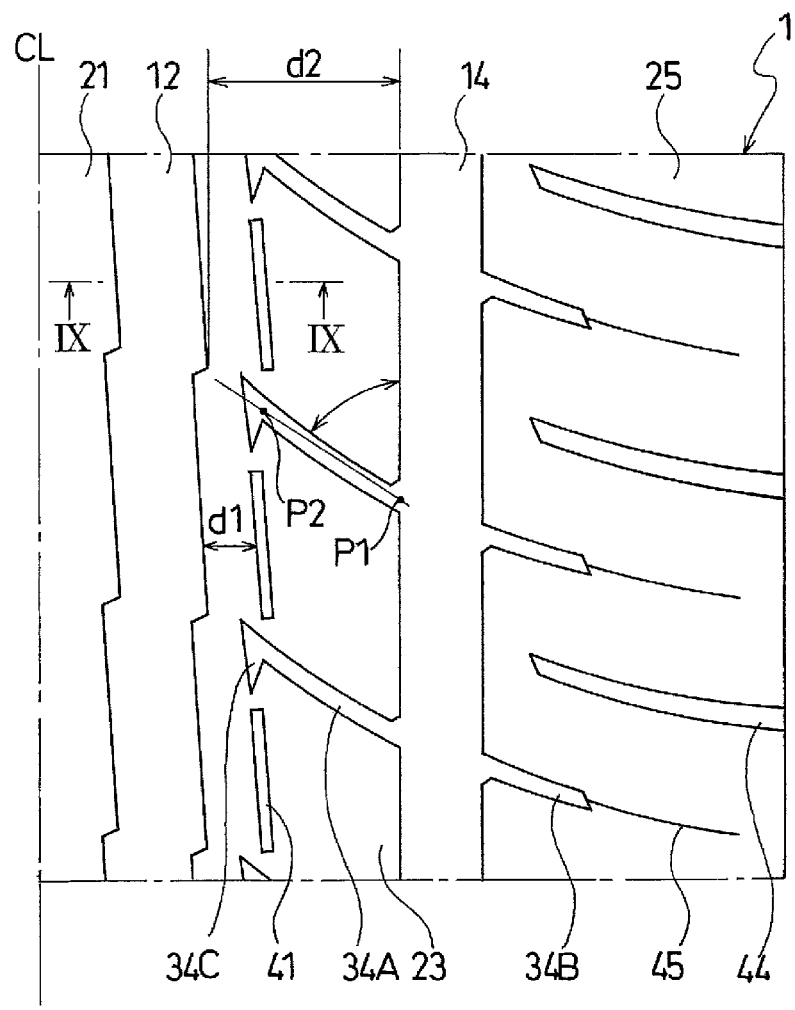
FIG. 3 is a plan view illustrating a main portion of the tread pattern of FIG. 2.
Figure 4:
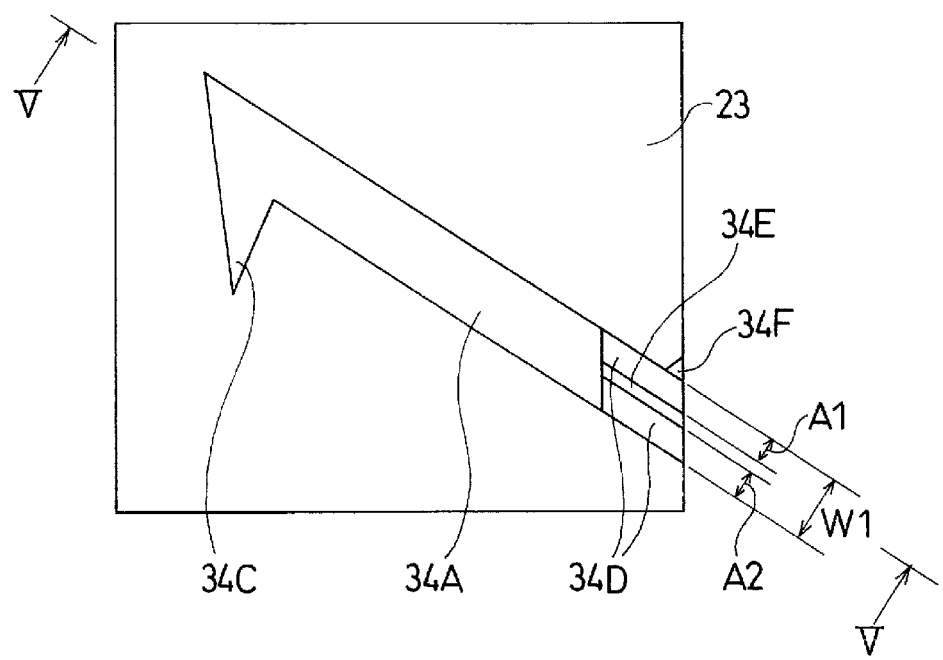
FIG. 4 is a plan view illustrating a lug groove including a bent portion in the tread pattern of FIG. 2.
Figure 5:
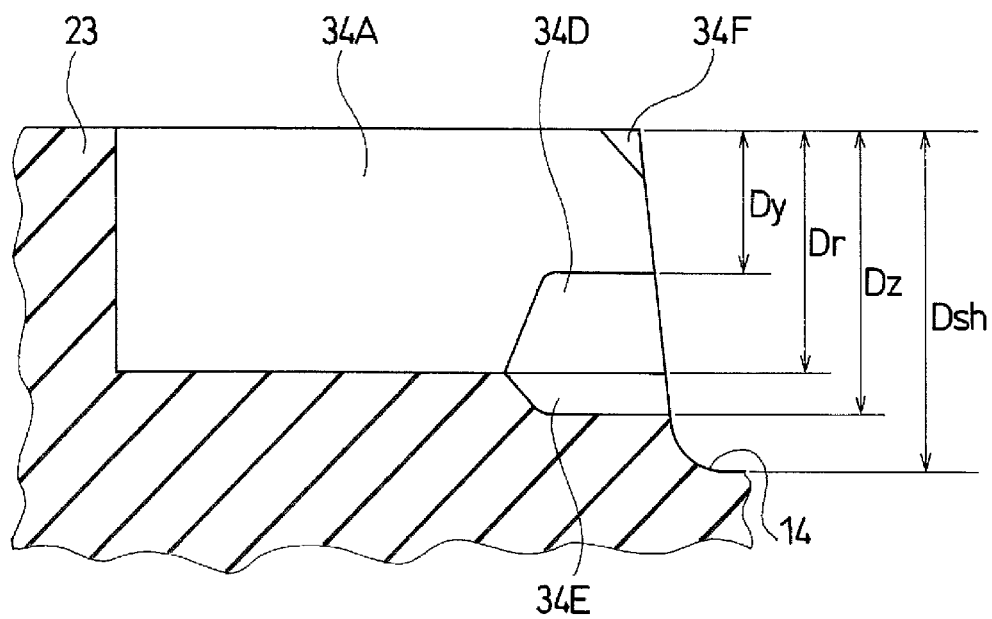
FIG. 5 is a cross-sectional view taken along line V-V of FIG. 4.
Figure 6:
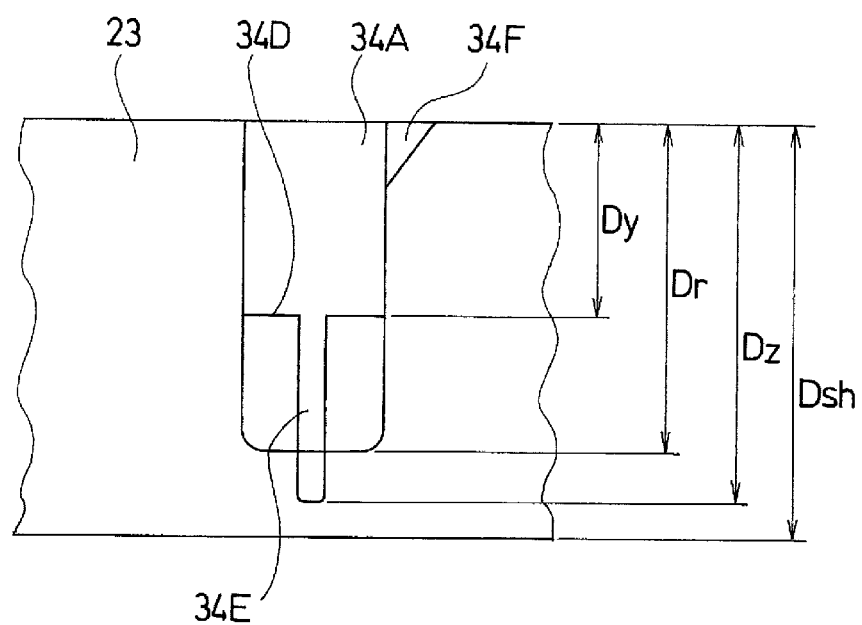
FIG. 6 is a side view from a shoulder main groove side illustrating a raised bottom portion and a communicating portion formed in a lug groove.

As illustrated in FIG. 3, in the intermediate land portion 23, the lug groove 34A extending inward from the shoulder main groove 14 in the tire lateral direction includes a hook-shaped bent portion 34C bending toward one side in the tire circumferential direction at the terminating end of the lug groove 34A. Additionally, as illustrated in FIGS. 4 to 6, each lug groove 34A includes a raised bottom portion 34D and a communicating portion 34E disposed at a portion of the lug groove 34A on the opening end side. The raised bottom portion 34D and the communicating portion 34E are aligned in the width direction of the lug groove 34A. The raised bottom portion 34D is shallower than the groove bottom of the lug groove 34A. The communicating portion 34E extends in the longitudinal direction of the lug groove 34A following the raised bottom portion 34D and is deeper than the raised bottom portion 34D. More specifically, raised bottom portions 34D are integrally formed with both groove walls of the lug groove 34A, and the communicating portion 34E is disposed at a position separated from both groove walls of the lug groove 34A (a central position of the lug groove 34A in the width direction). Additionally, a chamfered portion 34F is formed at a portion of the lug groove 34A on the opening end side.

Figure 7:
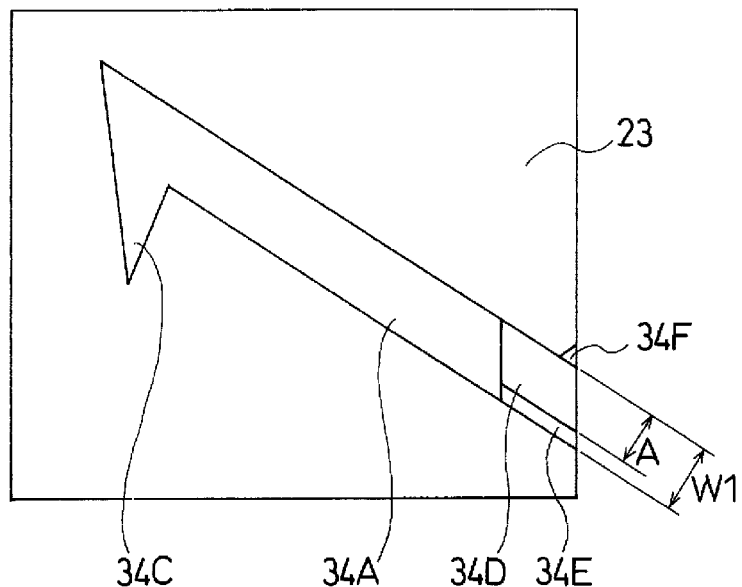
FIG. 7 is a plan view illustrating a raised bottom portion and a communicating portion formed in a lug groove according to a modified example.
Figure 8:
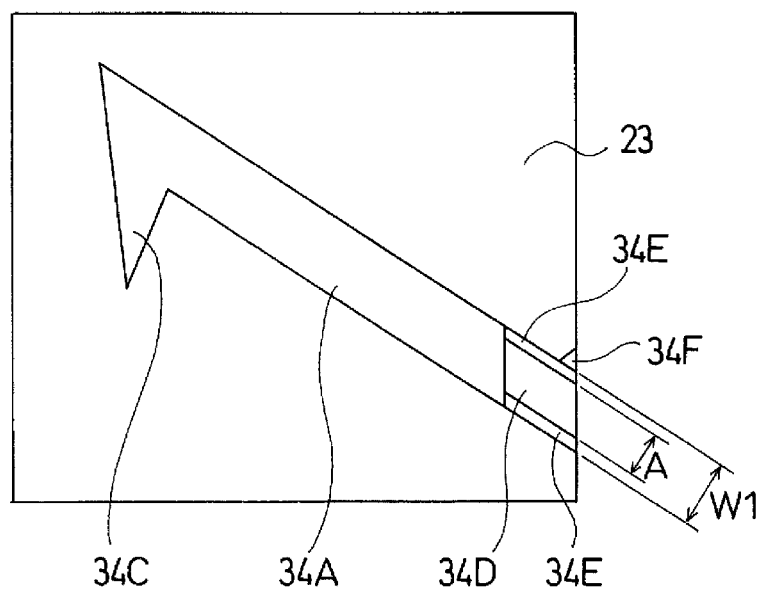
FIG. 8 is a plan view illustrating a raised bottom portion and a communicating portion formed in a lug groove according to another modified example.

Here, the raised bottom portion 34D and the communicating portion 34E formed in the lug groove 34A can also have the arrangements illustrated in FIGS. 7 and 8. In FIG. 7, the raised bottom portion 34D is integrally formed with one groove wall of the lug groove 34A, and the communicating portion 34E is disposed between the other groove wall of the lug groove 34A and the raised bottom portion 34D. In this configuration, the raised bottom portion 34D is preferably integrally formed with the groove wall on the side where the land portion 23 forms an acute angle portion. This effectively increases the rigidity of the land portion 23. In FIG. 8, the raised bottom portion 34D is disposed in a central portion of the lug groove 34A in the width direction, and communicating portions 34E are disposed between the raised bottom portion 34D and both groove walls of the lug groove 34A. In this configuration, the pair of communicating portions 34E can sufficiently ensure a drainage passage when the pneumatic tire is worn.

As illustrated in FIG. 3, a plurality of narrow grooves 41 intermittently extending in the tire circumferential direction without communicating with the bent portions 34C are formed in the intermediate land portion 23, in which the lug grooves 34A including the bent portions 34C are formed. The narrow grooves 41 have a width of 3.0 mm or less, and include so-called sipes. These narrow grooves 41 are disposed substantially parallel with the center main groove 12 having a zigzag shape.

The narrow grooves 41 are not necessarily strictly parallel with the center main groove 12. When the relationship $(d1_{max}-d1_{min})/d1_{max} \leq 0.1$ is satisfied, where a minimum value $d1_{min}$ and a maximum value $d1_{max}$ of a gap d1 between the narrow grooves 41 and the center main groove 12 in the tire axial direction are measured, the narrow grooves 41 and the center main groove 12 can be regarded as substantially parallel with each other.

A circumferential auxiliary groove 42 extending in the tire circumferential direction is formed in the shoulder land portion 24. The circumferential auxiliary groove 42 has a width ranging from 0.8 mm to 3.0 mm. Moreover, a plurality of shoulder lug grooves 43 extending inward in the tire lateral direction from an end portion of the tread portion 1 are formed in the shoulder land portion 24 with an interval between each other in the tire circumferential direction. The shoulder lug grooves 43 intersect the circumferential auxiliary groove 42, and terminate before reaching the shoulder main groove 13.

A plurality of shoulder lug grooves 44 extending inward in the tire lateral direction from the other end portion of the tread portion 1 are formed in the shoulder land portion 25 with an interval between each other in the tire circumferential direction. The shoulder lug grooves 44 terminate before reaching the shoulder main groove 14. A plurality of sipes 45 extending outward in the tire lateral direction from the end portion of the corresponding lug groove 34B are also formed in the shoulder land portion 25.

The pneumatic tire described above includes the center main groove 12 extending in the tire circumferential direction and the shoulder main groove 14 extending in the tire circumferential direction at a position outward from the center main groove 12 formed in the tread portion 1 and the plurality of lug grooves 34A formed in the intermediate land portion 23 between the center main groove 12 and the shoulder main groove 14. This configuration can ensure steering stability on wet road surfaces. Moreover, by the lug grooves 34A terminating within the intermediate land portion 23, the rigidity of the intermediate land portion 23 can be sufficiently ensured, and good steering stability on dry road surfaces and steering stability on wet road surfaces can be provided in a compatible manner. Furthermore, providing the raised bottom portion 34D at a portion of the lug groove 34A on the opening end side suppresses collapse of the intermediate land portion 23 and enhances uneven wear resistance and steering stability, and providing the communicating portion 34E extending in the longitudinal direction of the lug groove 34A following the raised bottom portion 34D ensures a drainage passage between the lug groove 34A and the shoulder main groove 14 when wear has advanced, thus suppressing a decrease in wet performance when the pneumatic tire is worn.

In the pneumatic tire described above, a configuration in which the raised bottom portions 34D are integrally formed with both groove walls of the lug groove 34A and the communicating portion 34E is disposed at a position separated from both groove walls of the lug groove 34A can effectively suppress collapse of the intermediate land portion 23 and increase the effect of enhancing uneven wear resistance and steering stability.

In the pneumatic tire described above, a width A of the raised bottom portion 34D and a width W1 of the lug groove 34A preferably satisfy the relationship $0.50 \times W1 \leq A \leq 0.90 \times W1$. Here, the width A of the raised bottom portion 34D means the total width of the raised bottom portion 34D disposed in the lug groove 34A and in the example of FIG. 4 is the sum of a width A1 and a width A2. By setting the width A of the raised bottom portion 34D in the range described above, an effect of enhancing uneven wear resistance and steering stability can be ensured, and a decrease in wet performance when the pneumatic tire is worn can be suppressed. When the ratio A/W1 is less than 0.50, the rigidity of the land portion 23 is reduced, thus reducing an effect of enhancing uneven wear resistance and steering stability on dry road surfaces. When the ratio A/W1 is greater than 0.90, an effect of suppressing a decrease in wet performance when the pneumatic tire worn is reduced.

In the pneumatic tire described above, a depth Dy of the lug groove 34A at the raised bottom portion 34D and a depth Dr of the lug groove 34A preferably satisfy the relationship 0.40×Dr≤Dy≤0.85×Dr. The depth Dr of the lug groove 34A is a depth from the road contact surface of the intermediate land portion 23 to the groove bottom of the lug groove 34A (the groove bottom of a portion without the raised bottom portion 34D and the communicating portion 34E). By setting the depth Dy of the lug groove 34A at the raised bottom portion 34D in the range described above, uneven wear resistance can be enhanced in a well-balanced manner with steering stability on dry road surfaces and steering stability on wet road surfaces. When the ratio Dy/Dr is less than 0.40, an effect of enhancing wet performance is reduced. When the ratio Dy/Dr is greater than 0.85, the rigidity of the land portion 23 is reduced, thus an effect of enhancing uneven wear resistance and steering stability on dry road surfaces decreases.

A depth Dz of the lug groove 34A at the communicating portion 34E is preferably greater than the depth Dr of the lug groove 34A and less than a depth Dsh of the shoulder main groove 14 that the lug groove 34A opens to. By setting the depth Dz of the lug groove 34A at the communicating portion 34E in the range described above, a decrease in wet performance when the pneumatic tire is worn can be effectively suppressed. Note that the depth Dz of the lug groove 34A at the communicating portion 34E can be the same as or less than the depth Dr of the lug groove 34A.

Moreover, in the pneumatic tire described above, preferably, the center main groove 12 has a zigzag shape in the tire circumferential direction, the bent portion 34C bending to one side in the tire circumferential direction is formed in each of the lug grooves 34A on the terminating end side, the plurality of narrow grooves 41 extending intermittently in the tire circumferential direction are formed in the intermediate land portion 23 without communicating with the bent portions 34C, and the narrow grooves 41 are disposed substantially in parallel with the center main groove 12 having a zigzag shape. The center main groove 12 having a zigzag shape contributes to improving steering stability on wet road surfaces through the edge effect thereof. Furthermore, the bent portions 34C of the lug grooves 34A extending inward in the tire lateral direction from the shoulder main groove 14 increase an effect of enhancing wet performance through the edge effect of the bent portions. Additionally, the narrow grooves 41 intermittently disposed substantially parallel with the center main groove 12 suppress a decrease in rigidity of the intermediate land portion 23 to a minimum and contribute to improving steering stability on wet road surfaces through the edge effect thereof. Thus, an arrangement including a combination of the center main groove 12 having a zigzag shape, the bent portions 34C of the lug grooves 34A, and the narrow grooves 41 provides good steering stability on dry road surfaces and wet road surfaces in a highly compatible manner, and further enhances uneven wear resistance.

In the pneumatic tire described above, as illustrated in FIG. 3, an inclination angle α of the lug grooves 34A including the bent portions 34C with respect to the tire circumferential direction preferably ranges from 25° to 75°. Setting the inclination angle α of the lug grooves 34A with respect to the tire circumferential direction in the above-described range reliably ensures the effect of enhancing steering stability on dry road surfaces. When the inclination angle α is less than 25°, acute angled portions are formed in the land portion 23 and cause a local decrease in rigidity, and thus adversely affecting steering stability on dry road surfaces. When the inclination angle α is greater than 75°, behavior of portions at both sides of the lug grooves 34A becomes uncorrelated, leading to a decrease in rigidity as a pattern, and thus adversely affecting the steering stability on the dry road surfaces. Note that the inclination angle α of the lug grooves 34A is an angle of a straight line connecting groove width center positions P1 and P2 of the lug grooves 34A, excluding the bent portions 34C, at both ends in the longitudinal direction with respect to the tire circumferential direction.

Figure 9:
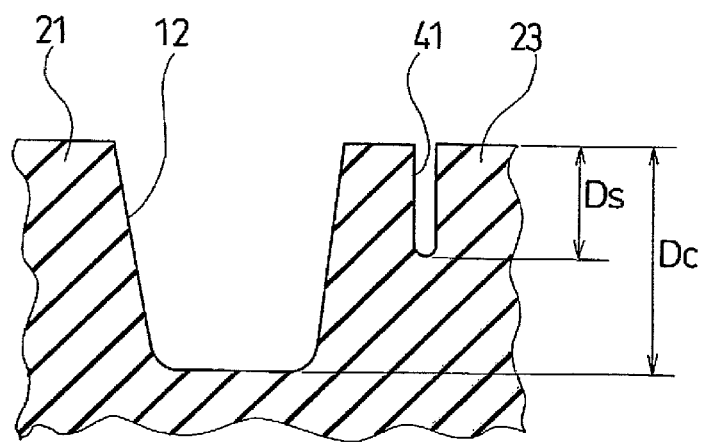
FIG. 9 is a cross-sectional view taken along IX-IX of FIG. 3.

As illustrated in FIG. 9, in the pneumatic tire described above, the depth Ds of the narrow grooves 41 and the depth Dc of the center main groove 12 having a zigzag shape preferably satisfy the relationship 0.10×Dc≤Ds≤0.50×Dc. Setting the depth Ds of the narrow grooves 41 in the above-described range effectively enhances steering stability on dry road surfaces and uneven wear resistance. When the ratio Ds/Dc is less than 0.10, the effect of enhancing uneven wear resistance decreases. When the ratio is greater than 0.50, the rigidity of the land portion 23 decreases, and thus steering stability on dry road surfaces is adversely affected.

Furthermore, in the pneumatic tire described above, the gap d1 in the tire axial direction between the narrow grooves 41 and the center main groove 12 having a zigzag shape and a width d2 of the land portion 23 in the tire axial direction preferably satisfy the relationship 0.10×d2≤d1≤0.40×d2. Setting the gap d1 between the narrow grooves 41 and the center main groove 12 having a zigzag shape in the above-described range maximizes the effect of enhancing uneven wear resistance. When the ratio d1/d2 falls outside the above-described range, the rigidity of the land portion 23 cannot be made sufficiently uniform, and thus the effect of enhancing uneven wear resistance decreases. Note that the width d2 of the land portion 23 is the smallest width of the land portion 23 adjacent to the center main groove 12 having a zigzag shape, and that the gap d1 is defined as an average value of a smallest value $d1_{min}$ and a maximum value $d1_{max}$ of the gap d1 between the narrow grooves 41 and the center main groove 12 when the gap d1 changes.

Additionally, in the pneumatic tire described above, the plurality of lug grooves 31A, 31B, 33A, 33B, 34A, and 34B formed in the tread portion 1, extending from the main grooves 11, 13, and 14, and not the center main groove 12 having a zigzag shape, toward both sides in the tire lateral direction and terminating within the corresponding land portions 21 to 25, ensure excellent drainage performance while minimizing a decrease in rigidity of the tread portion 1. In other words, the lug grooves 31A, 31B, 33A, 33B, 34A, and 34B deliver efficient drainage performance by guiding water on road surfaces to the corresponding center main grooves 11, 13, and 14, and at the same time, maintain high rigidity of the tread portion 1 by not completely dividing the land portions 21 to 25. Thus, good steering stability on dry road surfaces and wet road surfaces can be provided in a highly compatible manner.

In the embodiment described above, the pair of center main grooves 11 and 12 and the pair of shoulder main grooves 13 and 14 are formed in the tread portion 1, and the center main groove 12 has a zigzag shape extending in the tire circumferential direction. However, in the present technology, both the center main grooves 11 and 12 may have zigzag shapes extending in the tire circumferential direction. For example, the configuration of the tread pattern in the right part of the tire equator CL in FIG. 2 may be applicable to the left part of the tire equator CL, in a mirror symmetry or point symmetry. Additionally, in non-ideal embodiments of the present technology, the center main groove 12 may be linear as the other main grooves 11, 13, and 14 are or the narrow grooves 41 may be removed from the land portion 23. Furthermore, raised bottom portions and communicating portions may be provided in the lug grooves 31 formed in the center main groove 21. Within the bounds of a configuration meeting the requirement of the present technology, any tread pattern can be selected.

EXAMPLES

Pneumatic tires with a tire size of 215/55R17 and including a tread portion, a pair of sidewall portions, and a pair of bead portions were manufactured according to Examples 1 to 15. The pneumatic tires have the tread pattern of FIG. 2 and include the raised bottom portion (34D) and the communicating portion (34E) formed at a portion on the opening end side of each of the lug grooves (34A) formed in the intermediate land portion (23) disposed on the vehicle outer side.

Moreover, in the tires of Examples 2 to 15, one main groove, the center main groove (12), has a zigzag shape in the tire circumferential direction, the other main grooves (11, 13, 14) have a straight shape, the bent portion (34C) bending to one side in the tire circumferential direction is formed on the terminating end side in each of the lug grooves (34A) formed in the intermediate land portion (23), the plurality of narrow grooves (41) extending intermittently in the tire circumferential direction are formed in the intermediate land portion (23) without communicating with the bent portions (34C), and the narrow grooves (41) are disposed substantially in parallel with the center main groove (12) having a zigzag shape. In contrast, the tire of Example 1 has a configuration in which all of the main grooves (11 to 14) have a straight shape, and the bent portion (34C) and the narrow grooves (41) are not provided.

For comparison, a tire of a Conventional Example was prepared. This tire includes four straight main grooves including a pair of center main grooves extending in the tire circumferential direction and a pair of shoulder main grooves each extending outward in the tire circumferential direction of the corresponding center main groove, all of the main grooves having a straight shape, five land portions defined by the main grooves, and a plurality of lug grooves formed between the main grooves and communicating with the main grooves at both sides thereof.

Additionally, a tire of Comparative Example 1 and a tire of Comparative Example 2 were prepared. The tire of Comparative Example 1 has the same configuration as that of Example 1 except that it includes no communicating portion and the raised bottom portion are formed across the entire width of the lug groove. The tire of Comparative Example 2 has the same configuration as that of Example 1 except that instead of the raised bottom portion and the communicating portion, a projection is provided at the portion of the groove wall of the lug groove on the road contact surface side.

In Examples 1 to 15 and Comparative Examples 1 and 2, the ratio A/W1 of the width A of the raised bottom portion to the width W1 of the lug groove, the inclination angle α of the lug groove including a bent portion, the depth Ds of the narrow groove, the depth Dc of the center main groove, the depth Dsh of the shoulder main groove, the gap d1 between the narrow groove and the center main groove, the width d2 of the land portion including the narrow groove, the depth Dy of the lug groove at the raised bottom portion, the depth Dz of the lug groove at the communicating portion, and the depth Dr of the lug groove were set as indicated in Tables 1 and 2. For the raised bottom portion and the communicating portion, Examples 1 to 13 used the arrangement of FIG. 4, Example 14 used the arrangement of FIG. 7, and Example 15 used the arrangement of FIG. 8.

For these test tires, steering stability on dry road surfaces, steering stability on wet road surfaces, uneven wear resistance, and steering stability on wet road surfaces when the tire is worn were evaluated by the following testing methods, and the results are shown together in Tables 1 and 2.

Steering Stability on Dry Road Surfaces:

The sensory evaluations by panelists were conducted on dry road surfaces under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. Evaluation results were expressed as index values with the value of the Conventional Example being defined as 100. Larger index values indicate superior steering stability on dry road surfaces.

Steering Stability on Wet Road Surfaces:

The lap times were measured on a test course constituted by paved roads in rainy weather under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. The evaluation results were expressed, using the reciprocals of the measurement values, as index values with the value of the Conventional Example being defined as 100. Larger index values indicate superior steering stability on wet road surfaces.

Uneven Wear Resistance:

The amounts of wear of the center main grooves and the shoulder main grooves were measured to determine the level differences after 10000 km of traveling on a test course under conditions in which the test tires were assembled on wheels having a rim size of 17×7.5 J, mounted on a front-wheel drive vehicle of 2400 cc engine displacement, and the air pressures (F/R) after warm-up were set to 230 kPa/220 kPa. The evaluation results were expressed, using the reciprocals of the level differences, as index values with the value of the Conventional Example being defined as 100. Larger index values indicate superior uneven wear resistance.

Steering Stability on Wet Road Surfaces when the Tire is Worn:

The lap times were measured on a test course constituted by paved roads in rainy weather under conditions in which the test tires were assembled on wheels having a rim size of 17×7.5 J, mounted on a front-wheel drive vehicle of 2400 cc engine displacement, the air pressures (F/R) after warm-up were set to 230 kPa/220 kPa, and run for 20000 km prior to the test. The evaluation results were expressed, using the reciprocals of the measurement values, as index values with the value of the Conventional Example being defined as 100. Larger index values indicate superior steering stability on wet road surfaces when the tire is worn.

TABLE 1

|  | Conventional Example | Comparative Example 1 | Comparative Example 2 | Example 1 |
|---|---|---|---|---|
| Center main groove having zigzag shape? | No | No | No | No |
| Bent portion of lug groove? | No | No | No | No |
| Narrow groove? | No | No | No | No |
| Raised bottom portion in lug groove? | No | Yes | (Projection) | Yes |
| Communicating portion in lug groove? | No | No | No | Yes |
| Structure of raised bottom portion and communicating portion | — | — | — | FIG. 4 |
| Ratio A/W1 | — | 1.0 | — | 0.7 |
| Inclination angle α of lug groove including bent portion (°) | — | — | — | — |
| Depth Ds of narrow groove (mm) | — | — | — | — |
| Depth Dc of center main groove (mm) | 8.0 | 8.0 | 8.0 | 8.0 |
| Depth Dsh of shoulder main groove (mm) | 8.0 | 8.0 | 8.0 | 8.0 |
| Gap d1 between narrow groove and center main groove (mm) | — | — | — | — |
| Width d2 of land portion including narrow groove (mm) | 23 | 23 | 23 | 23 |
| Depth Dy of lug groove at raised bottom portion (mm) | — | 3.0 | — | 3.0 |
| Depth Dz of lug groove at communicating portion (mm) | — | — | — | 5.0 |
| Depth Dr of lug groove (mm) | 5.0 | 5.0 | 5.0 | 5.0 |
| Steering stability on dry road surfaces (index value) | 100 | 104 | 104 | 104 |
| Steering stability on wet road surfaces (index value) | 100 | 99 | 98 | 99 |
| Uneven wear resistance (index value) | 100 | 102 | 102 | 102 |
| Steering stability on wet road surfaces when tire is worn (index value) | 100 | 95 | 97 | 99 |

|  | Example 2 | Example 3 | Example 4 | Example 5 | Example 6 |
|---|---|---|---|---|---|
| Center main groove having zigzag shape? | Yes | Yes | Yes | Yes | Yes |
| Bent portion of lug groove? | Yes | Yes | Yes | Yes | Yes |
| Narrow groove? | Yes | Yes | Yes | Yes | Yes |
| Raised bottom portion in lug groove? | Yes | Yes | Yes | Yes | Yes |
| Communicating portion in lug groove? | Yes | Yes | Yes | Yes | Yes |
| Structure of raised bottom portion and communicating portion | FIG. 4 | FIG. 4 | FIG. 4 | FIG. 4 | FIG. 4 |
| Ratio A/W1 | 0.7 | 0.7 | 0.7 | 0.7 | 0.7 |
| Inclination angle α of lug groove including bent portion (°) | 50 | 25 | 75 | 50 | 50 |
| Depth Ds of narrow groove (mm) | 3.2 | 3.2 | 3.2 | 0.8 | 4.0 |
| Depth Dc of center main groove (mm) | 8.0 | 8.0 | 8.0 | 8.0 | 8.0 |
| Depth Dsh of shoulder main groove (mm) | 8.0 | 8.0 | 8.0 | 8.0 | 8.0 |
| Gap d1 between narrow groove and center main groove (mm) | 6.2 | 6.2 | 6.2 | 6.2 | 6.2 |
| Width d2 of land portion including narrow groove (mm) | 23 | 23 | 23 | 23 | 23 |
| Depth Dy of lug groove at raised bottom portion (mm) | 3.0 | 3.0 | 3.0 | 3.0 | 3.0 |
| Depth Dz of lug groove at communicating portion (mm) | 5.0 | 5.0 | 5.0 | 5.0 | 5.0 |
| Depth Dr of lug groove (mm) | 5.0 | 5.0 | 5.0 | 5.0 | 5.0 |
| Steering stability on dry road surfaces (index value) | 103 | 102 | 102 | 104 | 102 |
| Steering stability on wet road surfaces (index value) | 112 | 112 | 112 | 112 | 113 |

TABLE 1-continued

| | | | | | |
|---|---|---|---|---|---|
| Uneven wear resistance (index value) | 108 | 108 | 108 | 105 | 108 |
| Steering stability on wet road surfaces when tire is worn (index value) | 102 | 102 | 102 | 102 | 103 |

TABLE 2

| | Example 7 | Example 8 | Example 9 | Example 10 | Example 11 |
|---|---|---|---|---|---|
| Center main groove having zigzag shape? | Yes | Yes | Yes | Yes | Yes |
| Bent portion of lug groove? | Yes | Yes | Yes | Yes | Yes |
| Narrow groove? | Yes | Yes | Yes | Yes | Yes |
| Raised bottom portion in lug groove? | Yes | Yes | Yes | Yes | Yes |
| Communicating portion in lug groove? | Yes | Yes | Yes | Yes | Yes |
| Structure of raised bottom portion and communicating portion | FIG. 4 | FIG. 4 | FIG. 4 | FIG. 4 | FIG. 4 |
| Ratio A/W1 | 0.7 | 0.7 | 0.7 | 0.7 | 0.7 |
| Inclination angle α of lug groove including bent portion (°) | 50 | 50 | 50 | 50 | 50 |
| Depth Ds of narrow groove (mm) | 3.2 | 3.2 | 3.2 | 3.2 | 3.2 |
| Depth Dc of center main groove (mm) | 8.0 | 8.0 | 8.0 | 8.0 | 8.0 |
| Depth Dsh of shoulder main groove (mm) | 8.0 | 8.0 | 8.0 | 8.0 | 8.0 |
| Gap d1 between narrow groove and center main groove (mm) | 6.2 | 6.2 | 2.3 | 9.2 | 6.2 |
| Width d2 of land portion including narrow groove (mm) | 23 | 23 | 23 | 23 | 23 |
| Depth Dy of lug groove at raised bottom portion (mm) | 2.0 | 4.3 | 3.0 | 3.0 | 3.0 |
| Depth Dz of lug groove at communicating portion (mm) | 5.0 | 5.0 | 5.0 | 5.0 | 6.5 |
| Depth Dr of lug groove (mm) | 5.0 | 5.0 | 5.0 | 5.0 | 5.0 |
| Steering stability on dry road surfaces (index value) | 103 | 102 | 102 | 105 | 104 |
| Steering stability on wet road surfaces (index value) | 110 | 113 | 114 | 112 | 114 |
| Uneven wear resistance (index value) | 108 | 105 | 105 | 105 | 105 |
| Steering stability on wet road surfaces when tire is worn (index value) | 102 | 103 | 102 | 102 | 106 |

| | Example 12 | Example 13 | Example 14 | Example 15 |
|---|---|---|---|---|
| Center main groove having zigzag shape? | Yes | Yes | Yes | Yes |
| Bent portion of lug groove? | Yes | Yes | Yes | Yes |
| Narrow groove? | Yes | Yes | Yes | Yes |
| Raised bottom portion in lug groove? | Yes | Yes | Yes | Yes |
| Communicating portion in lug groove? | Yes | Yes | Yes | Yes |
| Structure of raised bottom portion and communicating portion | FIG. 4 | FIG. 4 | FIG. 7 | FIG. 8 |
| Ratio A/W1 | 0.5 | 0.9 | 0.7 | 0.7 |
| Inclination angle α of lug groove including bent portion (°) | 50 | 50 | 50 | 50 |
| Depth Ds of narrow groove (mm) | 3.2 | 3.2 | 3.2 | 3.2 |
| Depth Dc of center main groove (mm) | 8.0 | 8.0 | 8.0 | 8.0 |
| Depth Dsh of shoulder main groove (mm) | 8.0 | 8.0 | 8.0 | 8.0 |
| Gap d1 between narrow groove and center main groove (mm) | 6.2 | 6.2 | 6.2 | 6.2 |
| Width d2 of land portion including narrow groove (mm) | 23 | 23 | 23 | 23 |
| Depth Dy of lug groove at raised bottom portion (mm) | 3.0 | 3.0 | 3.0 | 3.0 |
| Depth Dz of lug groove at communicating portion (mm) | 5.0 | 5.0 | 5.0 | 5.0 |
| Depth Dr of lug groove (mm) | 5.0 | 5.0 | 5.0 | 5.0 |
| Steering stability on dry road surfaces (index value) | 102 | 105 | 102 | 102 |
| Steering stability on wet road surfaces (index value) | 114 | 110 | 112 | 112 |
| Uneven wear resistance (index value) | 108 | 108 | 106 | 106 |
| Steering stability on wet road surfaces when tire is worn (index value) | 106 | 101 | 102 | 102 |

As can be seen from Tables 1 and 2, the tires of Examples 1 to 15, as compared with the tire of the Conventional Example, provides good steering stability on dry road surfaces and steering stability on wet road surfaces in a compatible manner, has enhanced uneven wear resistance, and can suppress a decrease in wet performance when the tire is worn. The tires of Comparative Examples 1 and 2 had greatly reduced steering stability on wet road surfaces when the tire is worn.

The invention claimed is:

1. A pneumatic tire, comprising:
an annular tread portion extending in a tire circumferential direction;
a pair of sidewall portions disposed on either side of the tread portion; and
a pair of bead portions disposed inward of the sidewall portions in a tire radial direction;
the tread portion comprising
a plurality of main grooves comprising a center main groove extending in the tire circumferential direction and a pair of shoulder main grooves extending in the tire circumferential direction, and a plurality of land portions defined between the plurality of main grooves;
at least one land portion of the plurality of land portions comprising a plurality of lug grooves extending from at least one main groove of the plurality of main grooves and terminating within the at least one land portion;
at least one lug groove of the plurality of lug grooves comprising a raised bottom portion at a portion of the at least one lug groove on an opening end side of the at least one lug groove, the opening end side being opposite a terminating end side of the at least one lug groove where at least one lug groove terminates within the at least one land portion, the raised bottom portion being shallower than a groove bottom of the at least one lug groove, and the at least one lug groove further comprising a communicating portion that extends in a longitudinal direction of the at least one lug groove along the raised bottom portion and is deeper than the raised bottom portion; and
a bent portion being formed at a terminating end of the at least one lug groove, the bent portion being bent toward a first side in the circumferential direction, the at least one lug groove inclining from the shoulder main groove toward a second side in the circumferential direction opposite to the first side; wherein
a depth of the lug groove at the communicating portion is greater than a depth of the lug groove where the communicating portion terminates within the lug groove and less than a depth of a main groove of the plurality of main grooves that the lug groove opens to;
the communicating portion and the raised bottom portion both open directly to the main groove at laterally outer ends of the communicating portion and the raised bottom portion;
laterally inner ends of the communicating portion and the raised bottom portion both terminate at a same location in the tire width direction.

2. The pneumatic tire according to claim 1, wherein the raised bottom portion is integrally formed with both groove walls of the lug groove, and the communicating portion is disposed at a position separated from both the groove walls of the lug groove.

3. The pneumatic tire according to claim 1, wherein a width A of the raised bottom portion and a width W1 of the lug groove satisfy a relationship $0.50 \times W1 \leq A \leq 0.90 \times W1$.

4. The pneumatic tire according to claim 1, wherein a depth Dy of the lug groove at the raised bottom portion and a depth Dr of the lug groove satisfy a relationship $0.40 \times Dr \leq Dy \leq 0.85 \times Dr$.

5. The pneumatic tire according to claim 1, wherein
the center main groove has a zigzag shape in the tire circumferential direction;
the at least one lug groove is disposed in the at least one land portion, the at least one land portion being defined between the center main groove having the zigzag shape and one of the shoulder main grooves located outward of the center main groove;
the at least one lug groove extends inward in a tire lateral direction from the one of the shoulder main grooves, terminates at the terminating end without communicating with the center main groove;
a plurality of narrow grooves are disposed in the at least one land portion comprising the at least one lug groove, the plurality of narrow grooves extending intermittently in the tire circumferential direction without communicating with the bent portion; and
the plurality of narrow grooves are disposed substantially parallel with the center main groove having the zigzag shape.

6. The pneumatic tire according to claim 5, wherein a depth Ds of the plurality of narrow grooves and a depth Dc of the center main groove having the zigzag shape satisfy a relationship $0.10 \times Dc \leq Ds \leq 0.50 \times Dc$.

7. The pneumatic tire according to claim 5, wherein a gap d1 in a tire axial direction between the plurality of narrow grooves and the center main groove having the zigzag shape and a width d2 in the tire axial direction of the at least one land portion satisfy a relationship $0.10 \times d2 \leq d1 \leq 0.40 \times d2$.

8. The pneumatic tire according to claim 5, wherein an inclination angle α of the lug groove comprising the bent portion with respect to the tire circumferential direction ranges from 25° to 75°.

9. The pneumatic tire according to claim 2, wherein a width A of the raised bottom portion and a width W1 of the lug groove satisfy a relationship $0.50 \times W1 \leq A \leq 0.90 \times W1$.

10. The pneumatic tire according to claim 9, wherein a depth Dy of the lug groove at the raised bottom portion and a depth Dr of the lug groove satisfy a relationship $0.40 \times Dr \leq Dy \leq 0.85 \times Dr$.

11. The pneumatic tire according to claim 10, wherein
the center main groove has a zigzag shape in the tire circumferential direction;
the at least one lug groove is disposed in the at least one land portion, the at least one land portion being defined between the center main groove having the zigzag shape and one of the shoulder main grooves located outward of the center main groove;
the at least lug groove extends inward in a tire lateral direction from the one of the shoulder main grooves, terminates at the terminating end without communicating with the center main groove;
a plurality of narrow grooves are disposed in the at least one land portion comprising the at least one lug groove, the plurality of narrow grooves extending intermittently in the tire circumferential direction without communicating with the bent portion; and
the plurality of narrow grooves are disposed substantially parallel with the center main groove having the zigzag shape.

12. The pneumatic tire according to claim 11, wherein a depth Ds of the plurality of narrow grooves and a depth Dc of the center main groove having a zigzag shape satisfy a relationship $0.10 \times Dc \leq Ds \leq 0.50 \times Dc$.

13. The pneumatic tire according to claim 12, wherein a gap d1 in a tire axial direction between the plurality of narrow grooves and the center main groove having the zigzag shape and a width d2 in the tire axial direction of the at least one land portion satisfy a relationship $0.10 \times d2 \leq d1 \leq 0.40 \times d2$.

14. The pneumatic tire according to claim 13, wherein an inclination angle α of the lug groove comprising the bent portion with respect to the tire circumferential direction ranges from 25° to 75°.

15. The pneumatic tire according to claim 1, wherein the groove bottom that is deeper than the raised bottom portion is shallower than the communicating portion and the groove bottom extends along a majority of a tire width direction length of the at least one lug groove.

16. The pneumatic tire according to claim 1, wherein
the center main groove has a zigzag shape in the tire circumferential direction;
the at least one lug groove is disposed in the at least one land portion, the at least one land portion being defined between the center main groove having the zigzag shape and one of the shoulder main grooves located outward of the center main groove;
the at least one lug groove extends inward in a tire lateral direction from the one of the shoulder main grooves, terminates at the terminating end without communicating with the center main groove; and
opposing groove walls defining the center main groove are each uninterrupted by grooves and uninterrupted by sipes.

17. The pneumatic tire according to claim 5, wherein a gap d1 in a tire axial direction between the plurality of narrow grooves and the center main groove having the zigzag shape and a width d2 in the tire axial direction of the at least one land portion satisfy a relationship $0.10 \times d2 \leq d1 \leq 0.35 \times d2$.

18. The pneumatic tire according to claim 5, wherein the plurality of narrow grooves disposed substantially parallel with the center main groove having the zigzag shape are inclined with respect to the tire circumferential direction.

* * * * *